United States Patent
Bowers et al.

(10) Patent No.: US 9,576,194 B2
(45) Date of Patent: Feb. 21, 2017

(54) METHOD AND SYSTEM FOR IDENTITY AND AGE VERIFICATION

(71) Applicant: Klink Technologies, Inc., Boca Raton, FL (US)

(72) Inventors: Nicholas Ryan Bowers, Boca Raton, FL (US); Jeffrey Aaron Nadel, Boca Raton, FL (US)

(73) Assignee: Klink Technologies, Boca Raton, FL (US)

( * ) Notice: Subject to any disclaimer, the term of this patent is extended or adjusted under 35 U.S.C. 154(b) by 0 days.

(21) Appl. No.: 14/881,896

(22) Filed: Oct. 13, 2015

(65) Prior Publication Data

US 2016/0104041 A1 Apr. 14, 2016

Related U.S. Application Data

(60) Provisional application No. 62/063,383, filed on Oct. 13, 2014.

(51) Int. Cl.
*G06K 9/00* (2006.01)
*G06F 21/41* (2013.01)

(52) U.S. Cl.
CPC ........... *G06K 9/00483* (2013.01); *G06F 21/41* (2013.01); *G06K 9/00885* (2013.01)

(58) Field of Classification Search
CPC .. G06K 9/00783; G06K 9/00885; G06F 21/41
USPC ................ 382/112, 115, 119, 170, 182, 190, 209,382/219, 278; 340/5.81, 5.82, 5.83
See application file for complete search history.

(56) References Cited

U.S. PATENT DOCUMENTS

| | | | |
|---|---|---|---|
| 6,196,460 B1 | 3/2001 | Shin | |
| 6,679,425 B1 | 1/2004 | Sheppard et al. | |
| 7,013,051 B2 * | 3/2006 | Sekiguchi | G06F 17/3025 348/E5.112 |
| 7,864,987 B2 * | 1/2011 | Venkatanna | G06F 21/32 235/380 |
| 8,046,504 B2 * | 10/2011 | Feinberg | G06F 9/445 710/20 |
| 8,359,475 B2 * | 1/2013 | Griffin | G06F 21/32 713/186 |
| 8,447,859 B2 * | 5/2013 | Bobak | G06F 9/5061 705/7.12 |
| 8,468,355 B2 * | 6/2013 | Gerdes, Jr. | H04L 9/3213 713/170 |

(Continued)

*Primary Examiner* — Yosef Kassa
(74) *Attorney, Agent, or Firm* — DLA Piper LLP (US)

(57) ABSTRACT

Systems and Methods for identity information verification. The system includes an electronic device and a computing authentication unit. The electronic device includes a data capture unit for electronically scanning first data and second data corresponding to respective first and second locations of an identity document indicative of an individual. The computing authentication unit is configured to: perform a first verification to verify whether the first data matches the second data; perform a second verification, when the first data matches the second data, including comparing aggregated data from both the first and second data to identity data in one or more identity databases to verify personal identity information of the individual indicated in the identity document; and cause the electronic device to indicate a result of at least one of the first verification or the second verification.

20 Claims, 4 Drawing Sheets

(56) References Cited

U.S. PATENT DOCUMENTS

| | | | |
|---|---|---|---|
| 8,521,510 B2 * | 8/2013 | Gilbert | G06F 17/30893 704/10 |
| 2005/0137987 A1 | 6/2005 | May et al. | |
| 2013/0112746 A1 | 5/2013 | Krell et al. | |
| 2014/0201100 A1 | 7/2014 | Rellas et al. | |

* cited by examiner

METHOD AND SYSTEM FOR IDENTITY AND AGE VERIFICATION

The present application claims the benefit of U.S. Provisional Application. No. 62/063,383, filed Oct. 13, 2014, which is hereby incorporated by reference in its entirety.

TECHNICAL FIELD

The present disclosure relates generally to the field of identification systems and identity methods for documents and, more particularly, to computer-implemented methods and systems to identify the contents of documents used for identification purposes while minimizing any human error at a first level of verification, and to allow the information to be further verified for scrutiny at a second level of verification.

BACKGROUND

The problem of rampant and readily available fake identification cards, more particularly, driver licenses/passports, has caused many retailers to incur fines and face the loss of tobacco and liquor licenses, and has even subjected them to other forms of civil and criminal liability. Over a period of time, various attempts have been made to prevent or detect the use of fake identification cards, but not with a great deal of success.

The use of driver licenses and passports has expanded over the years to serve as identification for various applications. Examples of such applications include the purchase of alcohol, tobacco or lottery products, as well as for entrance to venues (e.g., gambling in casinos, off-track betting, movie theaters) and other user definable events (e.g., entrance into bars and nightclubs and other establishments where alcoholic beverages are served or sold). All of these businesses have a minimum age requirement for the purchase of a product at the point of transaction or for ingress into an establishment. A driver license and/or passport is typically a document used to provide age identification, and many types of age verification may be commonly accomplished in a relatively quick manner based on the identity document. There is a need to easily determine an identity document's authenticity so that an application having an age requirement (e.g., purchase of an age restricted product) is satisfied (e.g., at the time of purchase) in a convenient manner.

SUMMARY

Aspects of the present disclosure relate to systems and methods for identity information verification. The system includes a user device, such as an electronic device, and a computing authentication unit. The electronic device includes a data capture unit configured to electronically scan first data and second data corresponding to a respective first location and a second location of an identity document indicative of an individual. The computing authentication unit is coupled to a non-transitory memory storing an application. Execution of the application by the computing authentication unit causes the computing authentication unit to: perform a first verification comprising comparing the first data of the first location to the second data of the second location to verify whether the first data matches the second data; perform a second verification when it is verified that the first data matches the second data, the second verification including comparing aggregated data from both the first data and the second data to identity data in one or more identity databases to verify personal identity information of the individual indicated in the identity document; and cause the electronic device to indicate a result of at least one of the first verification or the second verification.

BRIEF DESCRIPTION OF DRAWINGS

In the accompanying figures, similar reference numerals may refer to identical or functionally similar elements. These reference numerals are used in the detailed description to illustrate various examples and to explain various aspects and advantages of the present disclosure.

DETAILED DESCRIPTION

A typical identification (ID) document includes information about the document holder such as a name, an address, a physical description, a date of birth, and a photograph. Many ID cards also contain some sort of machine-readable identifier such as a magnetic stripe, a bar-code, a smart chip, etc. ID documents, (e.g. ID cards) are typically used to restrict access to areas or products by unauthorized cardholders. For example, laws in every state require a person to be at least a minimum age to purchase alcohol or tobacco products. Similarly, in many states, a patron must be at least a minimum age to enter a bar. Typically, to verify that a person meets age requirements, the person may present an ID card prior to purchasing age-restricted products or prior to being admitted to an establishment having age requirements.

The following description of the preferred embodiment or embodiments is not intended to limit the scope of the invention to the precise form or forms disclosed, but instead is intended to be illustrative of the principles of the invention so that others skilled in the art may follow its teachings.

Current ID authentication systems either verify one portion of the ID or partially scan certain contents. Most of the time, there is incomplete verification of crucial parameters or data in an ID. And even if there is complete matching of data, current verification methods are often unable to detect that an ID is fake or fraudulent (for example, if it has been forged well enough such that data encoded on a machine-readable identifier matches data printed on the ID). Current processes are also cumbersome and time consuming, thus burdening the consumer and the retailer. In some cases, visual detection of fake IDs relies on black light (i.e., ultraviolet (UV)-A light) or other methods to determine whether or not IDs are issued by appropriate government agencies. A significant quantity of fake ID may easily passes these tests. It is also known in the art that barcode scanners only read the information encoded in the barcode. Thus, provided that the barcode is valid and encoded for an earlier date of birth, a fake ID may pass through the verification stage without being detected as inauthentic. Some current ID scanners may determine whether information encoded in the barcode agrees with information on the front of the card, and whether the front portion of the card conforms to the template of the appropriate state from which the ID is issued. However, these ID scanners do not verify the authenticity of the ID card user.

At a different level, the quality of fake ID's may lead to fake ID's being mistaken for genuine identification documents based on insufficient examination, and in light of the above discussion, there is an urgent need to use a sophisticated ID authentication and verification system.

The above-mentioned needs may be met by a method and system to enable a user of an ID Authentication and Verification System 100 (FIG. 1) to verify and ascertain the authenticity of an ID card/document and the user of the ID. The ID Authentication and Verification System 100 may include a currently executing software application/program, or may be part of a currently executing computer program that allows data to be transferred and processed in a plurality of processes, where the results or responses thus derived may be sent back to the computer program. The following detailed description is intended to provide example implementations to one of ordinary skill in the art, and is not intended to limit the disclosure to the explicit disclosure, as one of ordinary skill in the art will understand that variations can be substituted that are within the scope of the present disclosure as described.

Throughout, the specification the terms "ID" and "ID card" and "ID Document" are used interchangeably.

Figure 1:
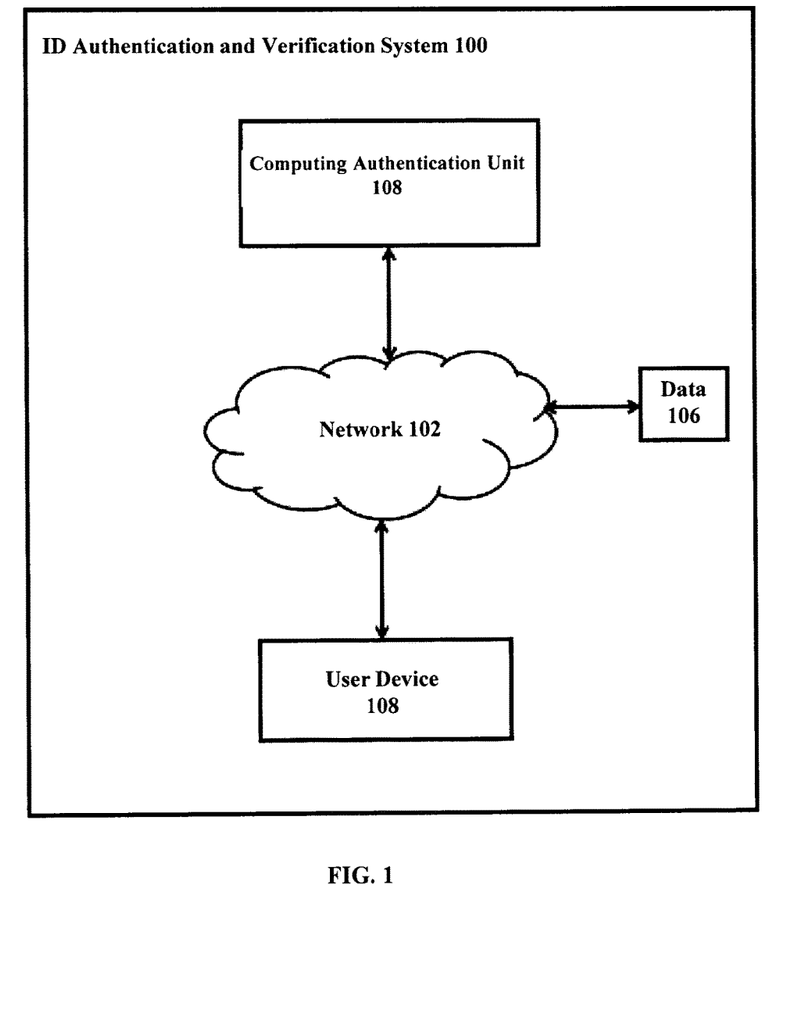
FIG. 1 is a functional block diagram of an exemplary identity (ID) authentication and verification system, according to aspects of the present disclosure.

FIG. 1 is a functional block diagram of an example ID Authentication and Verification System 100, according to aspects of the present disclosure.

The ID Authentication and Verification System 100 verifies and authorizes users in accessing various applications (e.g., information, products, events, secured area(s), equipment, etc.). The ID Authentication and Verification System 100 may include a Computing Authentication Unit 110 and a User Device 108. In some examples, Computing Authentication Unit 110 may be a separate entity from User Device 108 and may connected to a Network 102 for transfer of Data 106 to and from a User Device 108, and/or to a separate database. For example, Computing Authentication Unit 110 may be represented by a server device. In some examples, Computing Authentication Unit 110 may be configured as part of User Device 108 (e.g., as specialized software running on User Device 108). In some examples, Computing Authentication Unit 110 may include a software package installed on User Device 108, an Application Programming Interface (API) that the User Device 108 may connect to or a combination thereof.

In general, User Device 108 may include at least one data capture device (e.g., a camera, a machine-readable information scanner) to capture (i.e., scan) data (e.g., visual data and/or machine readable-information) from an ID document of an individual. Computing Authentication Unit 110 may perform two layers of verification based on the data collected via User Device 108. The first verification layer may verify the information on the physical ID document itself, by comparing information in two separate locations, such as both sides of the ID document. This comparison may also include matching templates for providing information in the first and second locations. The first and second locations may represent different locations on opposite sides of the ID document, different locations on the same side of the ID document, or locations on various pages in a multiple page document. In the description herein, the terms first and second locations may be used interchangeably with exemplary locations such as first and second sides as well as front and back sides. The second verification layer may verify the personal identity of the individual indicated on the ID document. Thus, the second verification layer may compare the "identity" of the user on the ID document with known real-world identities. Computing Authentication Unit 110 may provide an indication of successful and/or failed verification to User Device 108 at various points during the verification process, such as prior to the first verification layer (after the data collection), after the first verification layer (before the second verification layer) and/or after the second verification layer. User Device 108 may also include a user interface for initiating the verification process, reviewing verification results (received from Computing Authentication Unit 110) and/or modifying scanned data for verification (e.g., if text data was incorrectly interpreted by User Device 108 and/or Computing Authentication Unit 110).

In some examples, Computing Authentication Unit 110 may encrypt and send scanned user data and/or verification results as a customer record to one or more databases, to form stored Data 106. For example, ID information of an ID document user may be associated with an alcohol delivery order that verifies the age of the customer (or associating ID information with a customer record in a database, an event attendee, a nightclub patron, etc.) so that an audit may be performed at any point in time if any legal questions arise. Additionally, if a user has been identified as fraudulent or an ID is not considered authenticated/authenticated, such data may be stored to "whitelist" or "blacklist" a particular user.

In some examples, Computing Authentication Unit 110 may include one or more external Application Programming Interfaces (API), where the two verification layers may be triggered by an application (i.e., identification authentication software) via the API. The application may be installed on User Device 108 or on Computing Authentication Unit 110, or the application may exist on a server (not shown). In some examples, Computing Authentication Unit 110 may include specialized software installed on User Device 108, an API that User Device 108 may connect to or a combination thereof.

In some examples, User Device 108 may be used by a user (e.g., an employee such as a delivery driver or a bouncer) to verify the identity information of the customer on the customer's behalf. In some examples, User Device 108 may be used to register for an account on a secure service, and a user may be instructed to capture a picture of their ID document as part of the registration. The registration process may occur for the employee and/or the customer. The registration process may be performed via the User Device 108 and Computing Authentication Unit 110.

The Network 102 link(s) involved in the ID Authentication and Verification System 100 may include any suitable number or arrangement of interconnected networks including both wired and wireless networks. By way of example, a wireless communication network link over which mobile devices communicate may utilize a cellular-based communication infrastructure. The communication infrastructure may include cellular-based communication protocols such as Advanced Mobile Phone System (AMPS), Code Division Multiple Access (CDMA), Time Division Multiple Access (TDMA), Global System for Mobile Communications (GSM), Integrated Digital Enhanced Network (iDEN), General Packet Radio Service (GPRS), Enhanced Data rates for GSM Evolution (EDGE), Universal Mobile Telecommunications System (UMTS), Wideband CDMA (WCDMA) and their variants, among others. In various embodiments, the Network link 102 may further include, or alternately include, a variety of communication channels and networks such as a Wireless Local Area Network (WLAN)/Wi-Fi, Worldwide Interoperability for Microwave Access (WiMAX), Wide Area Networks (WANs), Near Field Communication (NFC) and Bluetooth, among others.

The ID Authentication and Verification System 100 may be operably connected with (or included within) an enterprise network (not shown). The Enterprise network may further include one or more of email or exchange servers, enterprise application servers, internal application store servers, authentication (AAA) servers, directory servers, Virtual Private Network (VPN)/SSL gateways, firewalls, among other servers and components. Email or exchange servers may include Exchange Active Sync (EAS) or other functionality that provides synchronization of contacts, calendars, tasks, and email between Active sync enabled servers and a User Device 108. Other synchronization products can also be used. The User Device 108 may access or utilize one or more of these enterprise systems or associated functionality.

In some examples, a server and/or a mobile development service may be hosted and operated by one or more third-party service providers and/or may be accessed by developers through network 102 using a developer computer. In certain embodiments, network may be any suitable type of wired and/or wireless network such as an Internet network or dedicated network that allows developers to access the ID Authentication and Verification System 100 through a developer computer. For example, as shown in FIG. 1, the ID Authentication and Verification System 100 may be in the form of a web server that can be accessed by developers through the Internet using a developer computer.

Developers may access the ID Authentication and Verification System 100 by navigating to one or more web pages using a standard web browser on a developer computer, thereby obviating the need to download and/or install separate software on the developer computer. In some examples, the ID Authentication and Verification System 100 may be a separate client or stand-alone software application that can be downloaded by developers from a server and/or one or more other third-party servers, or may be provided to developers through any other suitable means (e.g., compact disc (CD), physical disk, etc.) and installed on a developer computer.

In accordance with some examples, servers hosting the mobile development platform, or other third-party servers or systems, may insert advertisements or other forms of supplementary content into the applications created through the development platform and distributed to end users. The advertisements inserted into the applications may be based on various characteristics, such as application type, content, user information (e.g., aggregated demographic data), and/or geographic or temporal information. In some examples, the advertisements may be presented to end users in a non-intrusive manner. The advertisements may be presented within or on top of certain content elements included in the applications, and/or may be displayed temporarily or at certain predetermined stages of the application's execution. In some examples, other supplementary notifications, such as information related to the availability of updates to downloaded applications, new applications available from developers who created the downloaded applications, popular applications, and/or highly-rated applications may be sent to end users and/or inserted into applications developed through the platform.

In some examples, the ID Authentication and Verification System 100 may be developed through a mobile development platform and may be downloaded by end users for installation and/or execution on the User Device 108. The software for ID Authentication and Verification 100 may or may not have been previously installed on particular computers prior to the arrival of the mobile application. The ID Authentication and Verification System 100 may include least two parts: the state and the code. The state of the ID Authentication and Verification System 100 may contain all of the data stored, carried, and/or computed by the particular mobile application. The code of the ID Authentication and Verification System 100 may include a set of computer instructions which the host computer intends to carry out on behalf of the mobile app during the execution of the ID Authentication and Verification System 100 by the particular host computer. In addition, the ID Authentication and Verification System 100 may have other parts, including an Access Control List (ACL), an itinerary, a datastore, an audit log and so on.

In some examples, the ID Authentication and Verification System 100 may be downloaded from a digital distribution platform for use on supported User Devices 108.

In some examples, the ID Authentication and Verification System 100 may be downloaded from a development platform or a third-party application hosting service. In some examples, after the ID Authentication and Verification System 100 is downloaded and/or launched, the ID Authentication and Verification System 100 may access a remote storage medium to retrieve various data including features, content, and layout for the application, and display that data to the end user. In some examples, the application data may be accessed from the mobile development platform directly. In other examples, the application data may be accessed through a digital distribution platform or a third-party service. In some examples, the ID Authentication and Verification System 100 and/or User Device 108 may cache certain application data retrieved from the remote storage medium. In some examples, the ID Authentication and Verification System 108 may determine whether the application should use this cached data or whether it should access the application data from the remote storage medium.

In some examples, users may build and compile applications that are capable of running on multiple mobile operating systems and/or mobile devices. In some examples, the platform may allow users to take advantage of the various features and functionality specific to certain types of mobile devices and operating systems by incorporating and combining components that access these features.

Each User Device 108 category may be associated with the group of User Devices 108 that run a particular mobile operating system (e.g., various versions of Apple's iPhone®, iPad® and iPod Touch®, which run the iOS mobile operating system). Each User Device 108 type may be associated with a subset of a mobile device category, based on the type of mobile device (e.g., smart-phone, tablet, etc.). Each User Device 108 model may be associated with a single User Device 108 (e.g. Apple's iPhone® 4) or all models of a particular User Device 108 (e.g., Apple's iPhone®).

Although it is mentioned that the User Device 108 may run on a particular mobile operating system, it is understood that the embodiments of the present disclosure can also be integrated into notebook computers, tablet computers, personal computers and/or Point Of Sale (POS) systems situated in an in-store/on-premises. The POS system may be configured with a Camera Device and/or a machine-readable information scanner, which may be coupled (wired or wirelessly) so that information may be captured for the User Device 108 (or POS in this case).

Figure 2:
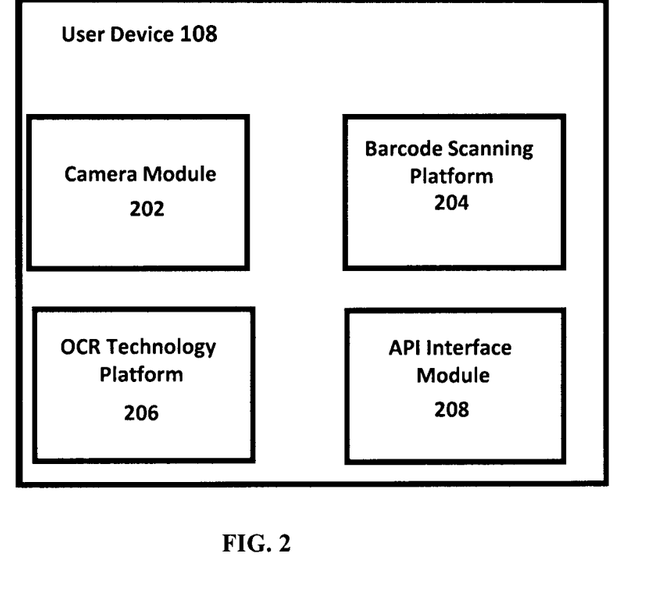
FIG. 2 is a functional block diagram illustrating exemplary modules in a user device of an ID authentication and verification system, according to the aspects of the present disclosure.

FIG. 2 is a functional block diagram depicting example modules in User Device 108 of the ID Authentication and Verification System 100 (FIG. 1), according to aspects of the present disclosure. As depicted in FIG. 2, the modules in the User Device 108 of the ID Authentication and Verification System 100 may include a Camera Module 202, a Barcode Scanning Platform 204, an optical character recognition (OCR) Technology Platform 206, and an Application Programming Interface (API) Module 208.

It must be noted that, in some examples, the Barcode Scanning Platform 204 need not use a separate physical component such as a Barcode Scanner. The Camera Module 202 may image the barcode on the ID document meant to be scanned, while the Barcode Scanning Platform 204 may read the barcode dynamically.

In some examples, a Database (not shown) used in the ID Authentication and Verification System 100 may include mass storage for data or instructions. As an example and not by way of limitation, storage may include a Hard Disk Drive (HDD), a floppy disk drive, flash memory, an optical disc, a magneto-optical disc, magnetic tape, a Universal Serial Bus (USB) drive or any combination thereof. Storage may include removable or non-removable (or fixed) media, where appropriate. Storage may be internal or external to the computer system, where appropriate. In some examples, storage may include non-volatile, solid-state memory. In some examples, storage may include read-only memory (ROM). In some examples, the ROM may include mask-programmed ROM, programmable ROM (PROM), erasable PROM (EPROM), flash memory or any combination thereof.

In some examples, User Device 108 (and/or System 100) may include an input/output (I/O) interface (not shown). The I/O interface may include hardware, software, or both, providing one and more interfaces for communication between System 100 and one or more I/O devices. The System 100 may include one or more of these I/O devices, where appropriate. One or more of these I/O devices may enable communication between a person and computer system 100. As an example and not by way of limitation, an I/O device may include a keyboard, a microphone, a display, a touch screen, a mouse, a speaker, a camera, another suitable I/O device or any combination thereof. An I/O device may include one or more sensors. The present disclosure contemplates any suitable I/O devices and any suitable I/O interfaces for the I/O devices. Where appropriate, an I/O interface may include one or more device or software drivers enabling a processor to drive one or more of these I/O devices. An I/O interface may include one or more I/O interfaces, where appropriate. Although the present disclosure describes and illustrates a particular I/O interface, the present disclosure contemplates any suitable I/O interface.

In some examples, User Device 108 (and/or system 100) may include a communication interface (not shown). The communication interface may include hardware and/or software providing one or more interfaces for communication (such as, for example, packet-based communication) between a computer system and one or more other computer systems or one or more networks. As an example and not by way of limitation, a communication interface may include a network interface controller (NIC) for communicating with an Ethernet or other wire-based network or a wireless NIC (WNIC) for communicating with a wireless network, such as a WI-FI network. The present disclosure contemplates any suitable network and any suitable communication interface thereof. As an example and not by way of limitation, System 100 may communicate with an ad hoc network, a personal area network (PAN), a local area network (LAN), a WAN, a metropolitan area network (MAN), or one or more portions of the Internet or any combination thereof. One or more portions of one or more of these networks may be wired or wireless. As an example, the System 100 may communicate with a wireless PAN (WPAN) (e.g., a BLUETOOTH WPAN), a WI-FI network (e.g., a 802.11a/b/g/n WI-FI network), a WI-MAX network, a cellular telephone network (e.g., a GSM network, a Long Term Evolution (LTE) or XLTE network), other suitable wireless networks or any combination thereof.

In particular embodiments, User Device 108 (and/or system 100) may include a bus (not shown). The bus may include hardware and/or software coupling components of the System 100 to each other. As an example and not by way of limitation, the bus may include an Accelerated Graphics Port (AGP) or other graphics bus, an Enhanced Industry Standard Architecture (EISA) bus, a front-side bus (FSB), a HYPERTRANSPORT (HT) interconnect, an INFINIBAND interconnect, a low-pin-count (LPC) bus, a memory bus, a Peripheral Component Interconnect Express or PCI-Express bus, a serial advanced technology attachment (SATA) bus, an Inter-Integrated Circuit (12C) bus, a Secure Digital (SD) memory interface, a Secure Digital Input Output (SDIO) interface, a Universal Serial Bus (USB) bus, a General Purpose Input/Output (GPIO) bus, another suitable bus or any combination thereof. The bus may include one or more buses, where appropriate.

In an example embodiment of the present disclosure, a technical problem may be solved by adding a second verification layer that verifies the personal identity of the individual on the ID to an ID based age/identity verification process. This particular process may help to eliminate the number of fake IDs which pass traditional verification techniques.

Generally, traditional scanning and verification techniques may include any technique previously used to authenticate the age of an individual, including but not limited to looking at an ID and performing a series of mathematical calculations on the birth date, or barcode scanners which pull the encoded information off of the back of an ID and then perform the final series of calculations using the birth date.

In another example embodiment of the present disclosure, the ID Authentication and Verification System 100 may be used by at least liquor stores, restaurants, bars, nightclubs, and any other business-oriented platform, retailer, venue, or other place or enterprise that desires verification of the age or identity of an individual in-person. Although the above description mentions the use of the ID Authentication and Verification System 100 in a some examples of business establishments, it is understood that aspects of the present disclosure may be implemented in any possible scenario requiring ascertaining and validating the contents of an ID document by the ID Authentication and Verification System 100.

More particularly, the ID Authentication and Verification System 100 may be used in business establishments that sell products or services whose sale, rental, or lease is governed by laws or regulations that stipulate a minimum age for such transactions, attendance, entry, or patronage; or businesses that need or desire to verify a person's age or identity in the course of business. The verification technology may also be used to verify identities and ages from state ID cards, passports, and other government-issued and privately-issued identification documents that can aid in the process of confirming or verifying a person's identity.

The Camera Module 202 may be located internally or may be externally connected to a User Device 108. For example, the Camera Module 202 may be a module in a Smart Phone such as a Moto X. It is not a prerequisite for a Smart Phone's camera to be of a certain pixel quality. However, it is desirable that the Camera Module 202 be configured to capture images and data clearly to scan from the first and second locations (e.g., front and back portions) of an ID document. In general, the Camera Module 202 may include flash functionality or other supplemental scanning technology to scan both the first and second locations, such as the front and back portions, of the User's ID clearly and legibly for suitable processing and analysis of the first and second location data portions by the Computing Authentication Unit 110.

Furthermore, the text, image, hologram and/or layout data from the first location (e.g., front portion) of the ID and the barcode or other machine-readable information from the second location (e.g., back) of the ID may be used and considered for verification purposes. Typically, it is considered that the text data is located at the front portion of the ID and the barcode or other machine-readable information is used from the back portion of the ID. The placement of such text and machine-readable information on the ID document may vary depending on the country and the jurisdiction by which or in which the ID was issued, and aspects of the present disclosure are intended to cover every such assortment.

In another example of the present subject matter, an API uses an OCR technique to allow for the electronic conversion of scanned or photographed images of typewritten or printed text and other symbols or characters from the first location (e.g., front portion) of the ID into machine-encoded/computer-readable text and other characters or symbols, and this data is then compared to the information/data encoded in the barcode on the first or second portions, such as the back/reverse portion of the ID (i.e., the second location). In general, the data converted by OCR may represent human-readable data, whereas the data decoded from the machine-readable indicator (e.g., a barcode) may represent machine-readable data. Accordingly, in some examples, the first verification may include comparing human-readable data (first data) from a first location on the ID document to machine-readable data (second data) from a second location on the ID document. It should be noted that, in some examples, the User Device 108 may be configured to communicate with the Computing Authentication Unit 110 over the Network 102 via an API. The APIs used in examples of the present disclosure may be a third party API, a licensed API or developed by any software developer.

The API used may also ensure that the template of the ID matches the template for the jurisdiction by which the ID was issued. For example, if the ID was issued in and/or by the state of Arizona, the Licensed API may be configured to properly ascertain and scrutinize the information and template provided. The template may be a visual representation. In general, the template represents a "model document" of the ID issued by the relevant jurisdiction. The visual representation may come in several forms, such as a photograph, a vector image, a drawing, a layout, a relational layout of graphical components, etc. In some examples, System 100 may use algorithms offered by external APIs to achieve the template matching. In some examples, the template matching may occur through a process directly on the User Device 108 or on Computing Authentication Unit 110. In general, the template-matching algorithm may include, but is not limited to, checking the layout of the document, ensuring that one or more components of the visual design of the template are present on the ID, ensuring that one or more components of the visual design of the template are placed in proper proximity on the ID, ensuring that one or more data fields from the template are present on the ID and filled out, ensuring that colors on the ID match the template colors, ensuring the presence of particular holograms, etc. In some examples, template matching may also be used to determine which optical character recognized fields correspond to particular data types (e.g., line 1 corresponds to a name, line 2 corresponds to an address, etc.). In some examples, template matching may be performed prior to comparing first and second locations of the ID document. Thus, in some examples, the verification process may terminate if the document layout does not match the predetermined template.

In case it is ascertained that the information obtained from the first and second locations (e.g., front and back) of the ID document corresponds to an individual having a fake ID with a barcode of some other person which is encoded with a different date and year of birth, the System 100 would reject that particular ID. Next, a certain portion of the collected information may be transferred to a second API which assists in age verification. The second API may obtain that particular collected information and compare it against various databases, to verify the age and identity of the user. Although, it is mentioned that a second API is implemented, examples of the present disclosure may also be configured to use a single API by placing a call to the second verification layer of the Computing Authentication Unit 110.

The double layer of verification may ensure that even the most sophisticated fake IDs do not pass the test of identity/age verification, without the individual having a fake identity that goes along with the fraudulent ID document. The double layer of verification methodology may ensure that the best fake or fraudulent identification documents cannot pass age/identity verification unless the false or fraudulent information printed or encoded on the identification documents is linked to a fully established fake identity that is corroborated by diverse (established) identity databases.

Fraudulent IDs may generated in a number of ways. A typical fake ID may just change the information on the front of an existing ID. In this case, the fake ID document may be rejected in the first layer of verification by System 100. If the fake ID document somehow made its way to the second layer of verification, it would also be rejected by System 100.

An example of this scenario is if someone were to print a fake ID by using an ID of an individual who is of legal age and digitally altering the name to match their own name. Another example of this scenario includes someone digitally altering the date of birth on their own ID to make the person appear to be of legal age. A more sophisticated fake ID will have a seemingly valid barcode on the back of the ID that passes tests on other barcode scanners. That is, the ID may have a barcode on one side that is readable by hardware and software elements that can scan and decode barcodes. If the data encoded in the barcode does not match the information on the front of the ID (e.g. the barcode is from another valid ID with an earlier birth date or with a different name or address, which is common in the case of fake IDs), then the first layer of verification will catch the discrepancy between the information provided on the front and the back of the ID. If the data encoded in the barcode does match the information on the front of the ID, but the ID is still fake, the ID will be rejected during the second layer of verification, where the actual identity of the person is checked.

To summarize, there are several possible versions of "underage" fraudulent ID's (which the embodiments of the present disclosure are intended to accurately detect and thwart). Some possible scenarios of fake IDs are enumerated below:

I) The ID has information on the front side that includes a false name, date of birth, and/or address and no barcode on the back side;

II) The ID has information on the front side that includes a false name, date of birth, and/or address and a barcode on the back with data encoded in it that does not match the information on the front side of the ID;

III) The ID has information on the front side that includes a false name, date of birth, and/or address and a barcode on the back with data encoded that does match the information on the front side of the ID; and IV) The ID has information on the front side that is accurate and genuine and a barcode on the back side with data encoded that includes a false name, date of birth, and/or address.

Scenario I may be identified by System 100 in the second layer of verification. IDs in Scenario I are becoming less common as all jurisdictions move to require barcodes on the back of the IDs. Scenario II may also be identified by System 100 in the first layer of verification. Scenario III may be identified by System 100 in the second layer of verification. The barcode and template match may allow the ID to pass the first layer of verification. However, the second layer of verification may identify the fraudulent ID document because the person's name and address will not correspond to the listed date of birth (when checked against one or more identity databases). Scenario IV may be identified by System 100 in the first layer of verification.

In a possible embodiment, an Authentication Module (not shown) may be used to verify the authenticity of users and secure the authentication process for verification purposes. The authentication module may be included as part of User Device 108, as part of Computing Authentication Unit 110 or may be on a remote server in System 100. For example, when a user logs in to register himself on the ID Authentication and Verification System 100, the Authentication Module may provide a captcha or a similar identification image in order to prevent robotic entries. The process may involve the verification of both the cardholder's identity and the card's authenticity. The Authentication Module (in case the present disclosure extends to payment security) can employ any one or combination of well-known authentication methods such as Address Verification Service (AVS), Card Security Codes, or Verified by Visa and MasterCard Secure code methods.

Figure 3:
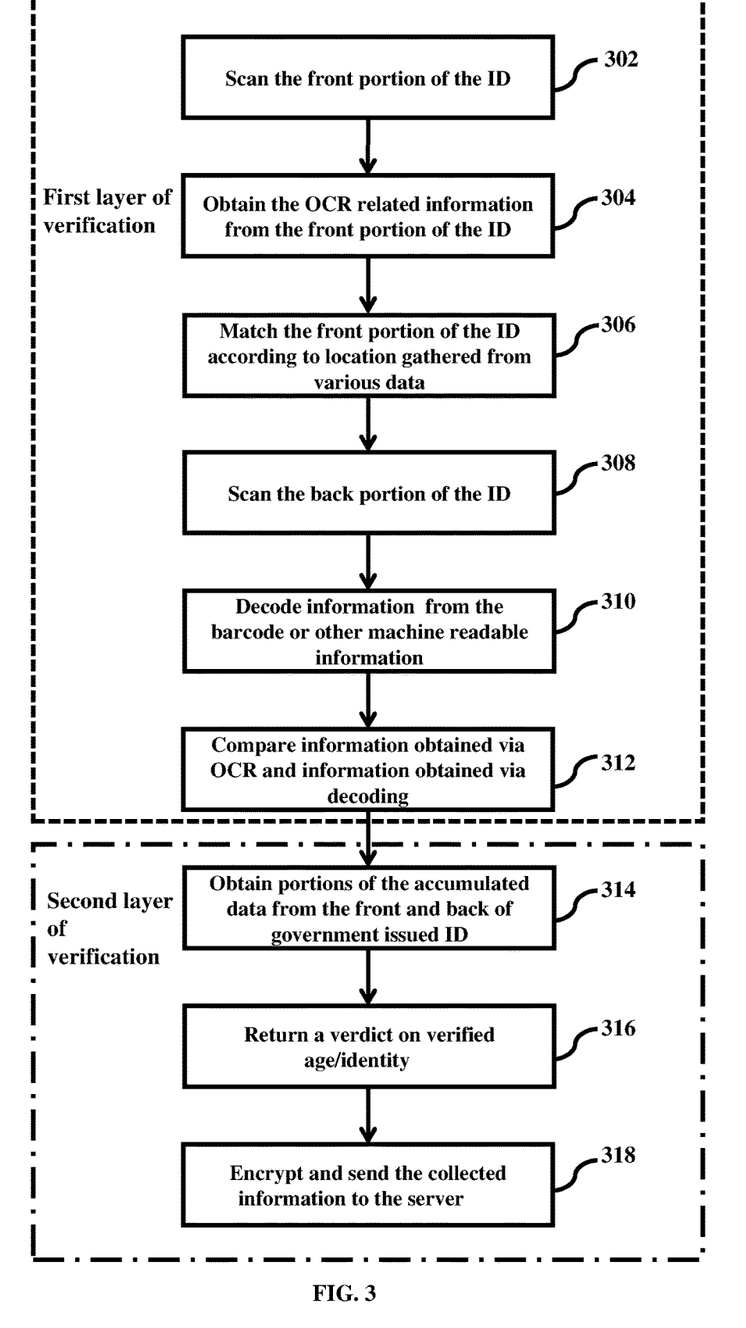
FIG. 3 is a flowchart diagram illustrating an exemplary method of authenticating and verifying an ID document, according to aspects of the present disclosure.

FIG. 3 is a flow chart diagram illustrating an example method of authenticating and verifying an ID, according to the aspects of the present disclosure.

Referring to FIG. 3, Steps 302 to 312 depict the first layer of verification and steps 314 to 318 depict the second layer of verification. The scanning steps 302 and 308 may be performed by at least one data capture unit of the User Device 108. The first layer of verification (steps 304, 306, 310 and 312) and the second layer of verification (steps 314-318) may be performed by Computing Authentication Unit 110. In some examples, Computing Authentication Unit 110 may perform the indicated steps of the first and second layers of verification via respective first and second APIs. The first API and/or layer may check that the first location (e.g., the front) of the ID conforms to a specific government's issued template and to also check that the information provided on the first and second locations (e.g., front and back) of the government issued ID match. Further, the second API/layer may ensure that the identification of the individual is corroborated by the available data on the person, thereby allowing verifying the identity and age of the person.

At step 302, the first location (e.g., front portion) of the ID may be scanned by the Camera Module 202 of the User Device 108, to scan first data representing the first location (e.g., front portion) of the ID. At step 304, OCR related information may be obtained from the first data representing the first location (e.g., front portion) of the ID, for example, using OCR techniques. At step 306, template matching of the first location (e.g., front portion) of the ID may be performed, for example, according to locations on the front portion from the first data as compared to locations on a predetermined template gathered from one or more sources of ID template data (e.g., a predetermined issuing body's ID template such as a state license template). In some examples, when the template matching fails to match the first location (e.g., front portion) information to the predetermined template, System 100 may send an indication to User Device 108 that the ID fails the verification process, and the process may terminate at step 306. Alternatively, the end user may be notified and allowed to manually bypass this portion of the verification (e.g. for low-light situations where it's very difficult to get a good picture to match a template).

At step 308, the second location (e.g., back portion) of the ID may be scanned by the Camera Module 202 (or a machine-readable information scanner) of the User Device 108 to scan second data representing the second location (e.g., back portion) of the ID. At step 310, information may be decoded from the second data that may represent a barcode or other machine-readable data.

At step 312, information obtained via the OCR technique (step 304) may be compared against the information obtained via decoding (step 310). When the information from the first data does not match the information from the second data, the ID may fail the first layer of verification. At that point, the System 100 may send an indication to User Device 108 that the ID fails the verification process, and the process may terminate at step 312. Alternatively, the end user may be notified and allowed to manually bypass this portion of the verification (e.g. for low-light situations where it's very difficult to get a good picture to match a template).

When Computing Authentication Unit 110 determines that the information from the first data does match the information from the second data, the first verification layer may proceed to the second verification layer. Accordingly, step 312 may proceed to step 314.

In an example, Computing Authentication Unit 110 may use a second API along with at least a portion of the information collected (i.e., accumulated) from the first layer of the verification process. The second API, in step 314, may obtain the accumulated information and compare this information against identity data in one or more identity databases to search for an identity matching the information collected during the first layer of the verification process. For example, information such as a first name, a last name, a date of birth, an address of residence, etc. may compared to verify the person's personal identity information (e.g., identity and/or age). Accordingly, the second verification layer may ensure that the identity information gathered earlier in the process matches the identity information associated with that individual in the databases against which the information is checked. Accordingly, the data from the first and second locations (e.g., front and back) of the ID document (e.g., a government issued ID) may be compared against one or more identity databases to establish identity and corroborate age or identity of the person.

In some examples, the Computing Authentication Unit 110 may compare the aggregated information against plural identity databases. In general, a degree of accuracy and/or confidence of System 100 may increase as the amount of data against which the accumulated information (from the ID) can be compared increases.

At the second layer of verification, at step 314, portions of the accumulated data gathered from the first and second locations (e.g., the front and back) of the ID document (in steps 302, 304, 308, 310) may be selected for the second verification. The portions selected may include, for example, a name, an address a driver's license number, or any suitable information that may be useful for comparison against (known) identity data. Thus, in some examples, a portion less than all of the collected information may be used for the second verification.

Further, to this at Step 316, the ID Authentication and Verification System 100 may compare the obtained portion of accumulated data against one or more identity databases, and may return a verdict on the credentials of the verified age/identity of the person. In other words, System 100 may determine whether the information on the ID matches and agrees with a real-world identity of the individual. In some examples, Computing Authentication Unit 108 may present an indication on User Device 108 (e.g., verification confirmed/verification rejected), for example, via an input/output interface of User Device 108. At step 318, Computing Authentication Unit 108 may encrypt the collected information encrypted and send the collected information to a server. Information may be encrypted for the purpose of security (such as in the case of a security breach caused by a hacker or because of other security breaches). The collected information may be stored as a customer record in Data 106.

In an example, all of the ID parameters (i.e., collected information) may not be transferred to be matched against identity database(s), as physical attributes such as hair color, eye color and height may be superfluous for the authentication of the identity. However, these parameters may still be stored to establish demographics of a customer base or profile returning customers.

In some examples, the ID Authentication and Verification System 100 may also capture image data, such as the photograph of the person from the first location (e.g., the front portion) of the ID and the signature image from other portions of the ID to aid in the authentication and verification process.

Overall, it may be appreciated that examples of the present disclosure use two verification layers for the purpose of verifying the age/identity of an individual and tries to solve the lacunae in traditional scanning techniques by adding a second verification layer to the age based verification processes.

One advantage of the present disclosure is that it may help eliminate the number of fraudulent IDs which pass through traditional scanning and screening techniques. Accordingly, System 100 may help to prevent unlawful purchase transactions (or unlawful entry or admission to businesses or other places) in which a minimum legal age requirement may be circumvented through the use of a fake or fraudulent ID documents.

In some examples, System 100 may use the information available from the ID document (e.g., a first name, a last name, an address, and a date of birth) to ensure that the information corresponds to a real identity that has that information. In other words, the System 100 seeks to match information. If the data on an ID has a real name and that person's real address, but a fake date of birth, the System 100 may determine that the date of birth provided does not match the real date of birth of the person whose name and address match the name and address provided on the ID. Similarly, if the ID has a real name, a fake address, and a fake date of birth, the System 100 may determine that a person by that name is not in fact associated with that address, and identify that the ID is fraudulent.

Example Use Scenario:

Consider that a teenager walks into a liquor store and demands a case of beer. The store clerk checks the ID of the teenager physically and then scans it with his mobile phone. The store clerk would have downloaded the ID Authentication and Verification System's application from an application store (e.g., an iOS Apple App Store). The clerk may capture an image of the front portion of the ID with the mobile phone's camera, and may capture the barcode on the back of the ID also with the mobile phone's camera. The API's used in the ID Authentication and Verification System 100 may return responses in less than a second, delivering a verification and authentication result to the user. It may take a little longer depending on the user and his ability to manually check the accuracy of the information returned before initiating the second layer of verification. The speed of the process may also be affected by the speed of the network used by the user's device (i.e., User Device 108). At this point, the Background processes running may include: 1) sending data from the ID document to the second API for verification against databases; 2) encrypting data; 3) communicating data and results of verification back to servers. The background processes running during the first layer of verification may include template matching, data matching (from the front and back of the ID document) and any sending/returning of the information by the ID Authentication and Verification System 100. Other actions may be taken based on the result of the verification. Next, the status of the customer's order is updated based on the result of the verification process. Because the legal age of drinking and procuring alcohol in America is 21, it was found by the enhanced verification process that the teenager had procured a fake ID and as a result was not allowed to purchase the items.

In an example, after the first layer of the verification process and before the second layer of the verification process, users may be given the opportunity to manually correct any information pulled from the ID before initiating the second layer of verification, in case the OCR method does not read the information as clearly as it should. For example, the poorly captured data may result from a poor photograph or overhead glare.

In an example, the OCR technique may recognize characters on the front of the ID (by discerning text characters from a photographic image) and may compare them to the information that is decoded from the barcode on the back of the ID. If the information does not match up to a reasonable degree, the ID Authentication and Verification System 100 may indicate that that the ID may be fraudulent. It is also noted, that examples of the present disclosure facilitate using a driver/retailer ID scanning verification app which retailers and drivers may use to verify the age of the customer at the point of delivery or the point of purchase.

Figure 4:
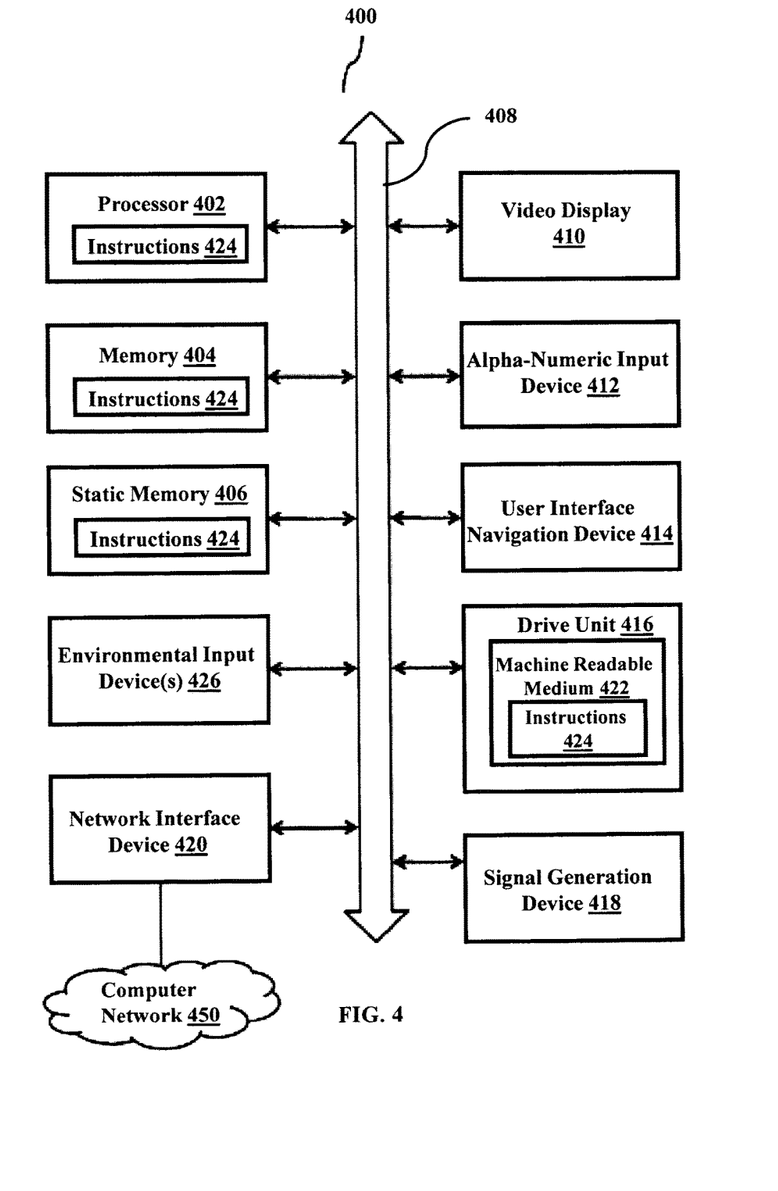
FIG. 4 is a functional block diagram of a machine in the exemplary form of a computer system 400 within which instructions for causing the machine to perform any one or more of the functions described herein may be executed.

Example System Architecture:

FIG. 4 is a block diagram of a machine in an example form of a computer system 400 within which instructions for causing the machine to perform any one or more of the functions or methodologies discussed herein may be executed. In alternative examples, the machine may operate as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, a switch or a bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies or functions discussed herein.

The example computer system 400 may include a processor 402 (e.g., a central processing unit (CPU), a graphics processing unit (GPU), or both), a main memory 404, and a static memory 406, which communicate with each other via a bus 408. The computer system 400 may further include a video display unit 410 (e.g., a liquid crystal display (LCD) or a cathode ray tube (CRT)). The computer system 400 may also include an alpha-numeric input device 412 (e.g., a keyboard), a user interface (UI) navigation device 414 (e.g., a mouse), a disk drive unit 416, a signal generation device 418 (e.g., a speaker), and a network interface device 420. The computer system 400 may also include one or more environmental input devices 426 that may provide a number of inputs describing the environment in which the computer system 400 or another device exists, including, but not limited to, any of a Global Positioning System (GPS) receiver, a temperature sensor, a light sensor, a still photo or video camera, an audio sensor (e.g., a microphone), a velocity sensor, a gyroscope, an accelerometer, and a compass.

Machine-Readable Medium:

The disk drive unit 416 may include a machine-readable medium 422 on which is stored one or more sets of data structures and instructions 424 (e.g., software) embodying or utilized by any one or more of the methodologies or functions described herein. The instructions 424 may also reside, completely or at least partially, within the main memory 404 and/or within the processor 402 during execution thereof by the computer system 400, the main memory 404 and the processor 402 also constituting machine-readable media.

While the machine-readable medium 422 is shown in an example embodiment to be a single medium, the term "machine-readable medium" may include a single medium or multiple media (e.g., a centralized or distributed database, and/or associated caches and servers) that store the one or more instructions 424 or data structures. The term "non-transitory machine-readable medium" shall also be taken to include any tangible medium that is capable of storing, encoding, or carrying instructions for execution by the machine and that cause the machine to perform any one or more of the methodologies of the present subject matter, or that is capable of storing, encoding, or carrying data structures utilized by or associated with such instructions. The term "non-transitory machine-readable medium" shall accordingly be taken to include, but not be limited to, solid-state memories, and optical and magnetic media. Specific examples of non-transitory machine-readable media include, but are not limited to, non-volatile memory, including by way of example, semiconductor memory devices (e.g., Erasable Programmable Read-Only Memory (EPROM), Electrically Erasable Programmable Read-Only Memory (EEPROM), and flash memory devices), magnetic disks such as internal hard disks and removable disks, magneto-optical disks, and CD-ROM and digital versatile disk (DVD)-ROM (DVD-ROM) disks.

Transmission Medium:

The instructions 424 may further be transmitted or received over a computer network 450 using a transmission medium. The instructions 424 may be transmitted using the network interface device 420 and any one of a number of well-known transfer protocols (e.g., Hyptertext Transfer Protocol (HTTP)). Examples of communication networks include a LAN, a WAN, the Internet, mobile telephone networks, Plain Old Telephone Service (POTS) networks, and wireless data networks (e.g., WiFi and WiMAX networks). The term "transmission medium" shall be taken to include any intangible medium that is capable of storing, encoding, or carrying instructions for execution by the machine, and includes digital or analog communications signals or other intangible media to facilitate communication of such software.

As described herein, computer software products may be written in any of various suitable programming languages, such as but not limited to C, C++, C#, Pascal, Fortran, Perl, Matlab (from MathWorks), SAS, SPSS, JavaScript, Objective-C, PHP, and Java. The computer software product may be an independent application with data input and data display modules. Alternatively, the computer software products may be classes that may be instantiated as distributed objects. The computer software products may also be component software, for example Java Beans (from Sun Microsystems) or Enterprise Java Beans (EJB from Sun Microsystems). Functionality described herein may be implemented in computer software, computer hardware, or any combination thereof.

Furthermore, a computer configured to run the previously mentioned computer software may be connected to a network and may interface to other computers using the network. The network may include an intranet, internet, or the Internet, among others. The network may include a wired network (for example, using an electrical conductor), a telephone network, a packet network, an optical network (for example, using optical fiber), a wireless network, or any combination thereof. For example, data and other information may be passed between the computer and components (or steps) of a system using a wireless network based on a protocol, for example Wi-Fi (IEEE standards 802.11, 802.11a, 802.11b, 802.11e, 802.11g, 802.11i, and 1802.11n). In one example, signals from the computer may be transferred, at least in part, wirelessly to components or other computers.

It is to be understood that although various components are illustrated herein as separate entities, each illustrated component represents a collection of functionalities which can be implemented as software, hardware, firmware or any combination of these. Where a component is implemented as software, it may be implemented as a standalone program, but may also be implemented in other ways, for example as part of a larger program, as a plurality of separate programs, as a kernel loadable module, as one or more device drivers or as one or more statically or dynamically linked libraries.

Furthermore, as will be apparent to one of ordinary skill in the relevant art, the portions, modules, agents, managers, components, functions, procedures, actions, layers, features, attributes, methodologies and other aspects of the disclosure may be implemented as software, hardware, firmware or any combination thereof. Of course, wherever a component of the present disclosure is implemented as software, the component may be implemented as a script, as a standalone program, as part of a larger program, as a plurality of separate scripts and/or programs, as a statically or dynamically linked library, as a kernel loadable module, as a device driver, and/or in any other way known now or in the future to those of skill in the art of computer programming. Additionally, the present disclosure is in no way limited to implementation in any specific programming language, or for any specific operating system or environment.

Furthermore, it will be readily apparent to those of ordinary skill in the relevant art that where the present disclosure is implemented in whole or in part in software, the software components thereof may be stored on computer readable media as computer program products. Any form of computer readable medium may be used in this context, such as magnetic or optical storage media. Additionally, software portions of the present disclosure may be instantiated (for example as object code or executable images) within the memory of any programmable computing device.

While the present disclosure has been discussed in terms of certain embodiments, it should be appreciated that the present disclosure is not so limited. The embodiments are explained herein by way of example, and there are numerous modifications, variations and other embodiments that may be employed that would still be within the scope of the present disclosure. Accordingly, the disclosure of the present disclosure is intended to be illustrative, but not limiting, of the scope of the disclosure, which is set forth in the following claims.

What is claimed is:

1. A system for identity information verification, the system comprising:
    a user device comprising a data capture unit configured to electronically scan first data and second data corresponding to a respective first location and a second location of an identity document indicative of an individual; and
    a computing authentication unit coupled to a non-transitory memory storing an application, execution of the application by the computing authentication unit causing the computing authentication unit to:
    perform a first verification comprising comparing the first data of the first location to the second data of the second location to verify whether the first data matches the second data;
    perform a second verification when it is verified that the first data matches the second data, the second verification comprising comparing aggregated data from both the first data and the second data to identity data in one or more identity databases to verify personal identity information of the individual indicated in the identity document; and
    cause the electronic device to indicate a result of at least one of the first verification or the second verification.

2. The system of claim 1, wherein the first data and the second data include at least one of text information, an image, a signature, hologram data, color information, data layout information or machine-readable information.

3. The system of claim 1, wherein the computing authentication unit is further configured to convert each of the first data and the second data to respective first information and second information, by at least one of optical character recognition, template matching or machine-readable decoding.

4. The system of claim 3, wherein the computing authentication unit is further configured to cause an input/output interface of the electronic device to present information representing one or more of the first information and the second information prior to at least one of the first verification and the second verification.

5. The system of claim 4, wherein the electronic device is configured to receive user input via the input/output interface indicating modification of the presented information, the received user input being used in at least one of the first verification and the second verification.

6. The system of claim 1, wherein the first verification includes comparing data among at least one of the first data and the second data to a predetermined template associated with a type of the identification document, to determine whether said data matches the predetermined template.

7. The system of claim 1, wherein the identity document includes at least one of a state-issued identity card, a passport, a government-issued identification document or a privately-issued identification document.

8. The system of claim 1, wherein the electronic device includes at least one of a mobile device, a tablet computer, a notebook computer, a personal computer or a point of sale (POS) device.

9. The system of claim 1, wherein the data capture unit includes at least one of a camera or a machine-readable information scanner.

10. The system of claim 1, wherein the computing authentication unit is configured to encrypt and transmit at least one of a result of the first verification, a result of the second verification, the scanned first data, the scanned second data to an electronic server, via a communication network.

11. The system of claim 1, wherein the computing authentication unit is part of electronic device.

12. The system of claim 1, wherein the computing authentication unit is remotely coupled to electronic device via a communication network.

13. The system of claim 1, wherein the computing authentication unit is configured to perform the first verification and the second verification via at least one application programming interface (API).

14. A computer-implemented method for verifying identity information, the method comprising the steps of:
    electronically scanning, by a data capture unit of an electronic device, first data and second data corresponding to a respective first and second location of an identity document indicative of an individual;
    performing, by a computing authentication unit, a first verification comprising comparing the first data of the first location to the second data of the second location to verify whether the first data matches the second data, the computing authentication unit coupled to a non-transitory memory storing an application for execution by the computing authentication unit;
    performing, by the computing authentication unit, a second verification, when it is verified that the first data matches the second data, the second verification comprising comparing aggregated data from both the first data and the second data to identity data in one or more identity databases to verify personal identity information of the individual indicated in the identity document; and causing, by the computing authentication unit, the electronic device to indicate a result of at least one of the first verification or the second verification.

15. The method of claim 14, wherein the first data and the second data include at least one of text information, an image, a signature, hologram data, color information, data layout information or machine-readable information.

16. The method of claim 14, the method further comprising converting, by the computing authentication unit, each of the first data and the second data to respective first information and second information, by at least one of optical character recognition, template matching or machine-readable decoding.

17. The method of claim 14, wherein the first data includes text information and the second data includes decoded machine-readable information and the first verification compares the text information to the decoded machine-readable information.

18. The method of claim 14, the method further comprising encrypting and transmitting, by the computing authentication unit, at least one of a result of the first verification, a result of the second verification, the scanned first data, the scanned second data to an electronic server, via a communication network.

19. The method of claim 14, wherein the first verification includes comparing data among at least one of the first data and the second data to a predetermined template associated with a type of the identification document, to determine whether said data matches the predetermined template.

20. A non-transitory computer readable medium programmed to include computer-readable instructions that, when executed by one or more processing devices, cause the one or more processing devices to perform functions including:

electronically scanning, by a data capture unit, first data and second data corresponding to a respective first location and a second location of an identity document indicative of an individual;

performing a first verification comprising comparing the first data of the first location to the second data of the second location to verify whether the first data matches the second data;

performing a second verification when it is verified that the first data matches the second data, the second verification comprising comparing aggregated data from both the first data and the second data to identity data in one or more identity databases to verify personal identity information of the individual indicated in the identity document; and  indicating, on an input/output interface, a result of at least one of the first verification or the second verification.

\* \* \* \* \*